United States Patent [19]

Schmucker et al.

[11] Patent Number: 4,870,773
[45] Date of Patent: Oct. 3, 1989

[54] COLLAPSIBLE AND TELESCOPING FISHING NET

[75] Inventors: Wayne A. Schmucker, West Unity; Ronald L. Rupp, Fayette, both of Ohio

[73] Assignee: Fishers of Men Corp., Ohio

[21] Appl. No.: 220,326

[22] Filed: Jul. 18, 1988

Related U.S. Application Data

[63] Continuation-in-part of Ser. No. 4,066, Jan. 16, 1987, abandoned.

[51] Int. Cl.⁴ .............................................. A01K 77/00
[52] U.S. Cl. ....................................................... 43/12
[58] Field of Search ..................... 43/7, 11, 12; 16/115

[56] References Cited

U.S. PATENT DOCUMENTS

| | | | |
|---|---|---|---|
| 2,725,658 | 12/1955 | Wiederhold | 43/12 |
| 3,167,878 | 2/1965 | Daffron | 43/12 |
| 4,050,177 | 9/1977 | Gerritsen | 43/12 |
| 4,138,790 | 2/1979 | Schmucker | 43/12 |
| 4,325,157 | 4/1982 | Balint | 16/115 |
| 4,574,513 | 3/1986 | Wearing | 43/12 |
| 4,619,065 | 10/1986 | Jones | 43/12 |

*Primary Examiner*—Kurt Rowan
*Attorney, Agent, or Firm*—Oldham & Oldham Co.

[57] ABSTRACT

Improvements for a collapsible fishing net comprising a collapsible rim assembly, a mesh netting, a yoke assembly with a hollow central sleeve, and a handle are shown. The improvements include fabricating the sleeve and handle with mating flattened surfaces to resist torquing forces, as well as providing the net with a telescoping extension handle. Other improvements include provision for controlling the position of various net components during assembly and disassembly, as well as modifying certain other components to assure improved functioning of the net, generally.

9 Claims, 4 Drawing Sheets

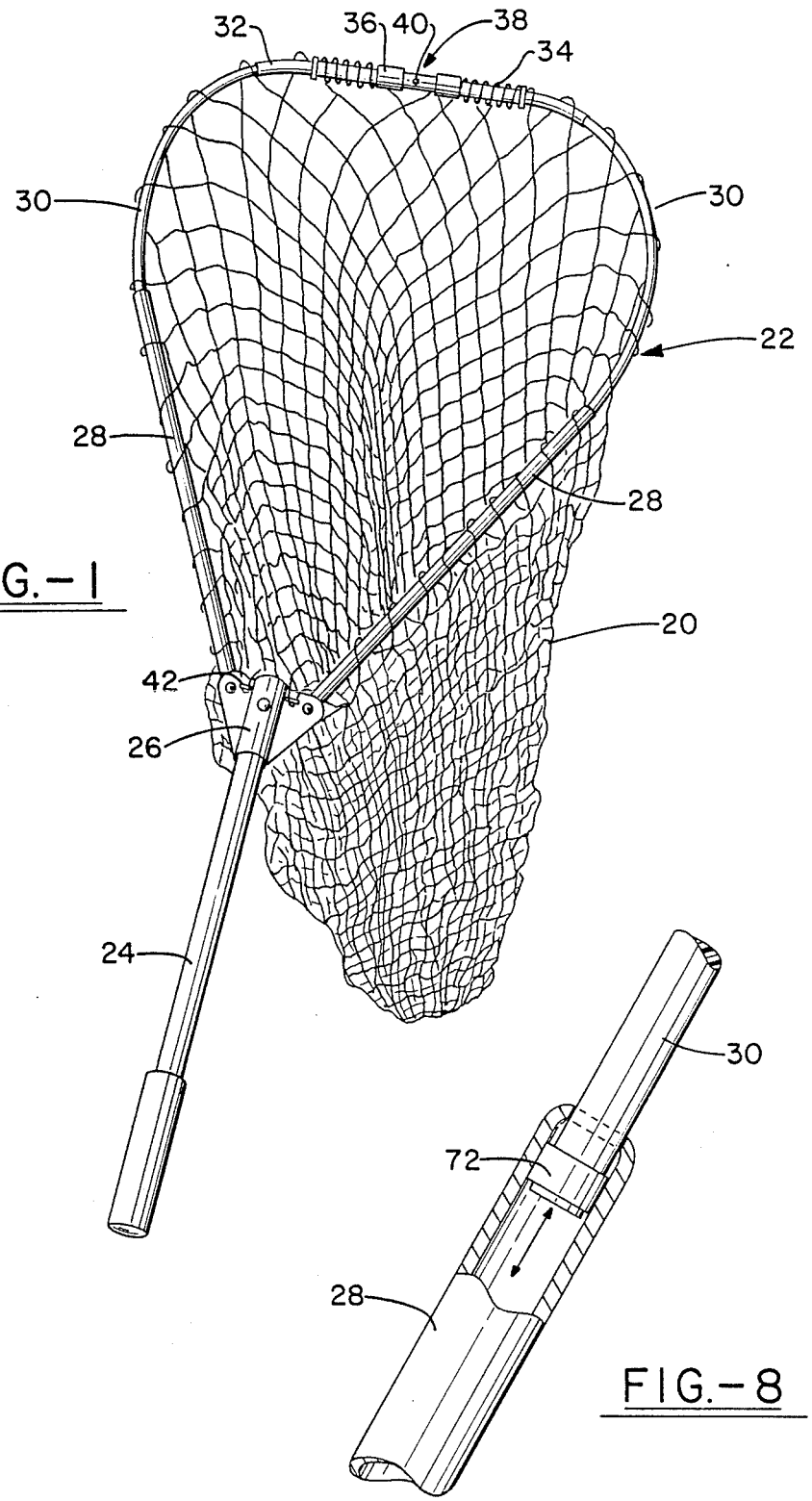

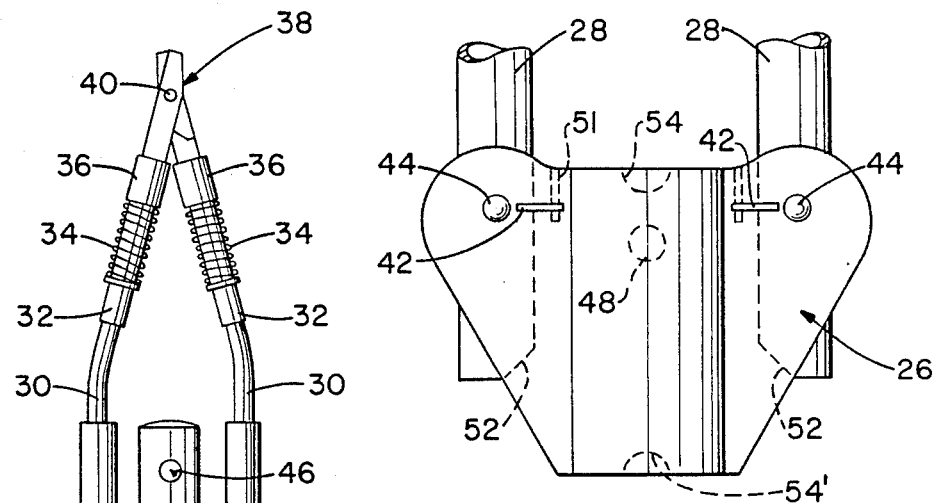
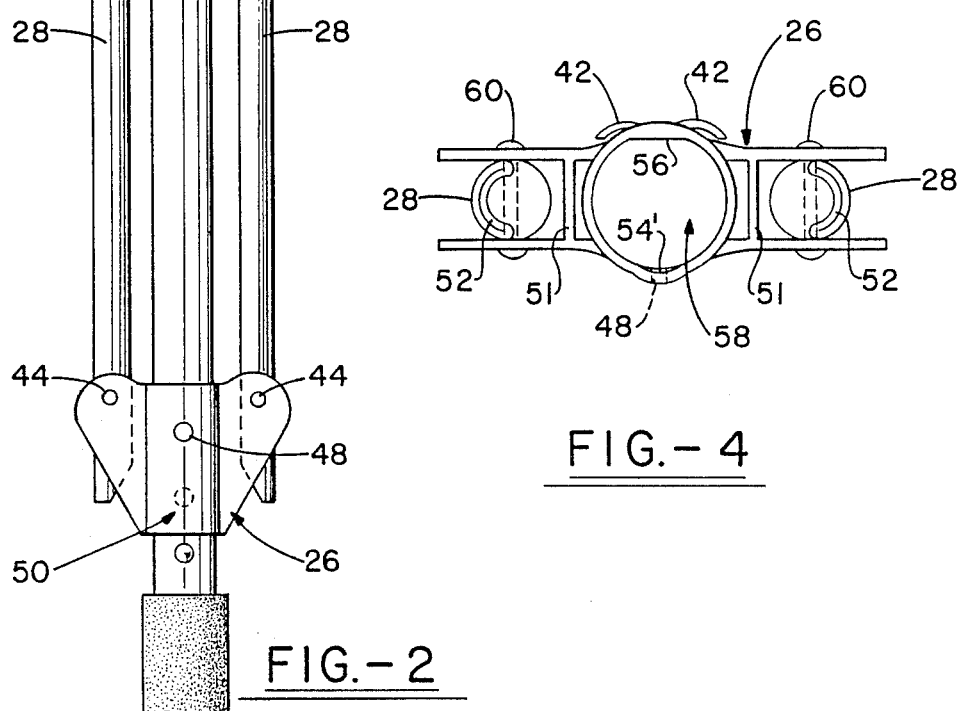

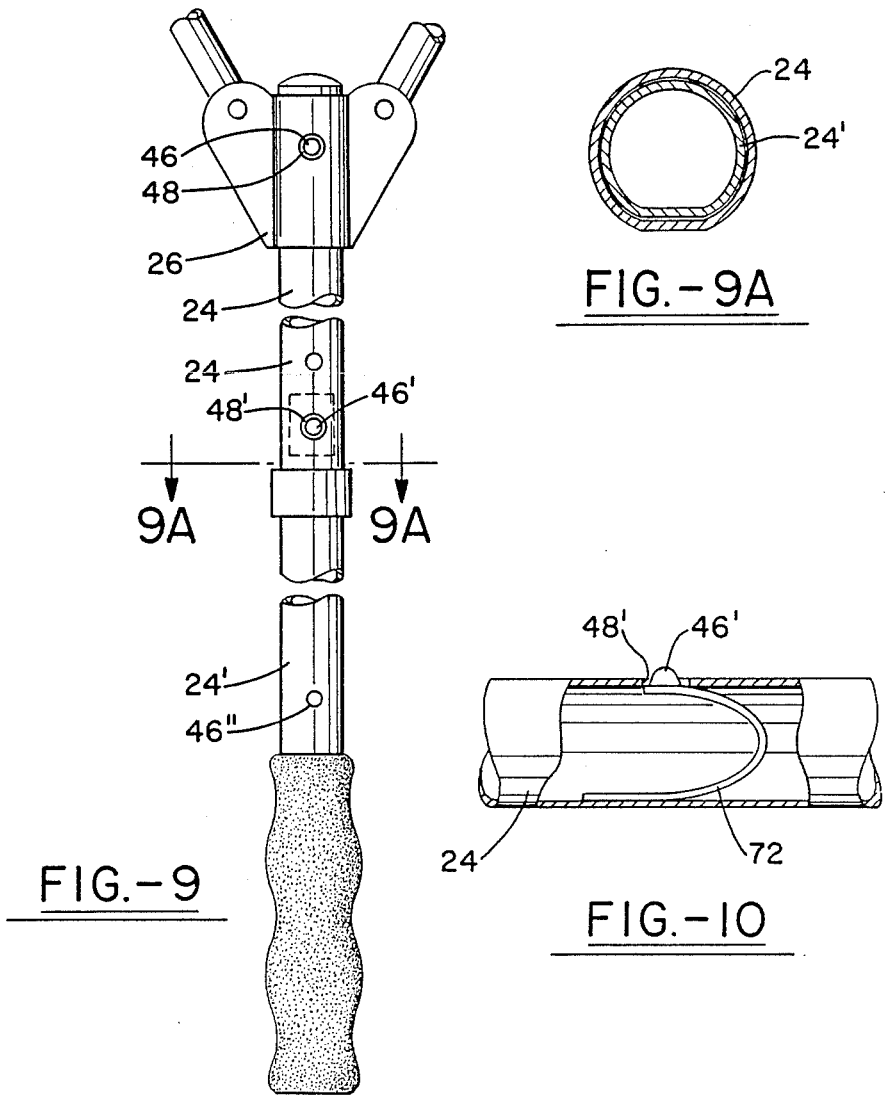

COLLAPSIBLE AND TELESCOPING FISHING NET

This application, which is a continuation-in-part of application Ser. No. 004,066, now abandoned, relates to a collapsible and telescoping fish net.

More particularly, the present invention relates to a collapsible and telescoping fish landing net which occupies minimal space when disassembled, and which can readily and quickly be assembled in an operational configuration. Specifically, this invention relates to a collapsible fish landing net with an improved collapsible handle, increased durability, and one which is easier to assemble and disassemble than its predecessors.

TECHNICAL FIELD

Leisure fishing is a pastime enjoyed by untold millions of sportspeople in this country, since it affords relaxation, provides an opportunity to be in the outdoors, and furnishes the challenge of capturing an elusive quarry. The sport can be pursued with very minimal equipment; however, like most other recreational activities, part of the pleasure of participation comes from owning the equipment used to engage in the activity. In addition, there is usually a definite and obvious relationship between a participant's equipment and the degree of success which will be experienced in achieving the sport's objectives. This is particularly true, in the case of fishing, and considerable sums are spent by most avid sport fisherpeople in pursuing their hobby.

In capturing fish, it is not only necessary to attract them and entice them into attempting to devour the lure or bait offered so as to become irreversibly impaled on the barbed hook concealed thereby, but also to bring the end of the line to which the fish is attached to the location of the angler, where the capture process is completed. In the latter stages of the capture, resort is commonly had to a so called "landing" net which is positioned beneath the struggling fish and lifted from the water so that the fish is snared in the enveloping net.

While the use of landing nets frequently allow the capture of fish which might otherwise free themselves, such nets are not without drawbacks. They are, for instance, generally rather large and bulky. This cumbersomeness makes it difficult to transport the nets to their location of use, due to space limitation often encountered in automobiles, planes, and the like used to transport anglers to the areas to be fished. For this reason, and despite their usefulness, landing nets are oftentimes dispensed with, even by those who might benefit most from their use.

BACKGROUND ART

A number of attempts have been made to eliminate the aforementioned difficulty, for example, by providing the landing nets with a collapsible structure. Among the schemes proposed for accomplishing this may be mentioned U.S. Pat. No. 3,340,874, involving a rim which is unfolded and secured by use of a series of hinges. U.S. Pat. No. 3,815,272, on the other hand, employs a rim which unfolds, using a series of three tubes, two of which are hinged together, with the second tube sliding along the third. In U.S. Pat. No. 2,727,328, the rim is stored in two pieces and connected after deployment from the handle.

Other nets using the concept of assembling the rims at the base of the handle include U.S. Pat. Nos. 2,471,273 and 3,579,890.

Still another type of fishing net is disclosed by U.S. Pat. No. 2,683,321, in which the rim is hinged at two points, the base of the handle, and the point furthest therefrom.

Additional collapsible nets are described in U.S. Pat. Nos. 270,641; 407,709 and 1,490,048.

Although the nets taught in the patents mentioned all have utility to some degree, an analysis of their functional elements shows inherent design flaws within their structure, for example, problems with assembly, tensile strength deficiencies, poor compressibility characteristics, and other problems.

Many of the deficiencies of the prior devices mentioned were overcome in U.S. Pat. No. 4,138,790, which teaches a collapsible fishing net apparatus having a telescoping and collapsible rim assembly, a collapsible handle assembly, a yoke assembly for receiving the rim and handle assemblies, and netting which is attached to the rim assembly.

The apparatus taught in the latter patent has notable advantages over the devices which preceded it in a number of important respects. It makes use of a simple design which is correspondingly easy to assembly or disassemble. The net apparatus is collapsible to one third of its extended length and one fifth of its extended width. Furthermore, as a consequence of the fact that it minimizes stress points, for example, by having a single hinge point in the rim, and because the rim and handle portions are permanently attached to each other, the apparatus is capable of successfully resisting the forces involved in the process of landing large fish.

Notwithstanding its superiority over other collapsible landing nets, however, a number of areas have been discovered which could benefit from improvement. Among these may be mentioned the fact that length of the net's handle represents a compromise between a desire to have a handle that extends far enough to snare fish at a convenient distance, and a conflicting desire to have a handle short enough for compact storage. Furthermore, in the act of using the net, a torquing force is frequently experienced at the point where the yoke assembly attaches the rim assembly to the handle. Resistance to such force would be benefited by desirably altering the nature of the yoke-to-handle attachment.

Although the design of the fishing net described in such patent is relatively simple, advantageously, it could be made even simpler, particularly with respect to assembly and disassembly. In addition, use of the net has disclosed areas of construction which could in some circumstances be prone to failure, and such use has suggested ways in which these might be strengthened to advantage.

Finally, while the net's simplicity and minimal number of components help to provide inexpensive construction, collapsible nets in general tend to be more expensive than their non-collapsible counterparts, and measures to reduce their cost and extend their useful life are desirable.

DISCLOSURE OF THE INVENTION

In light of the foregoing, it is an aspect of the invention to construct a fish landing net of a type similar to that described in U.S. Pat. No. 4,138,790, but with improvements.

In achieving such improvements, it is an aspect of this invention to provide a fish landing net with an extensible handle that can be extended to a greater length, while having the capability of being telescoped to a compact length when desired.

It is a further aspect of the invention to furnish such net with an improved interconnection between its handle component and its rim assembly so as to improve the ability of the fish landing net to withstand the torquing forces experienced in landing a fish.

Another aspect of this invention is to make an already easy assembly and disassembly process even easier to accomplish.

An additional aspect of the improved fish landing net of this invention is to furnish a design which simplifies many of the net's components, while strengthening still others.

Yet another aspect of this invention is to supply modifications which allow the netting of the apparatus to be uniformly deployed around the rim assembly and to be easily replaced when worn, thereby prolonging the useful life of the apparatus.

The foregoing and other aspects of the invention which will become apparent as the detailed description proceeds are achieved in a collapsible fish landing net including a collapsible rim assembly, mesh netting, a yoke assembly, and a primary handle;

said rim assembly having two hollow rigid housing cylinders and two flexible arctuate members telescopable thereinto, but not detachable therefrom, each said arctuate member being attached to a lockable pivot point for securing said rim assembly in an operating configuration;

said pivot point being lockable by spring caps urged into locking position by compression springs, thereby causing said caps to extend over parts of both arctuate members simultaneously so as to hold said members in aligned position when the landing net is in its operating configuration;

said netting being strung on said rim assembly;

said primary handle having a spring operated release button for optionally maintaining said landing net in its operating configuration, or for collapsing it to its storage configuration;

said yoke assembly having a hollow central sleeve through which said primary handle slides when the landing net is being collapsed or opened and said yoke assembly also being pivotally attached to said hollow rigid cylinders and having an opening through which said release button can extend, the improvement comprising providing said hollow central sleeve with at least one flattened surface, and providing said primary handle with a mating flattened surface, in order to better resist forces exerted on said landing net at its lateral edges.

BRIEF DESCRIPTION OF THE DRAWINGS

The invention will be better understood when reference is had to the accompanying drawings forming a part hereof in which:

FIG. 1 is a bottom plan view of the fishing net of the invention in its deployed position;

FIG. 2 is a top plan view of the fishing net in its collapsed configuration;

FIG. 3 is a bottom plan view of the rim handle yoke assembly;

FIG. 4 is a handle end elevation of the rim handle yoke assembly of FIG. 3;

FIG. 7 is a handle side elevation of the rim assembly hinge;

FIG. 8 is a partial cross section of the housing cylinder junction with the rim assembly arctuate member;

FIG. 9 is a broken top plan view of the telescoping handle assembly in its deployed position;

FIG. 9A is cross section taken along the line 9A—9A of FIG. 9;

FIG. 10 is a cut-away view of the spring release knob in its position of use.

BEST MODE FOR CARRYING OUT THE INVENTION

Figure 5:
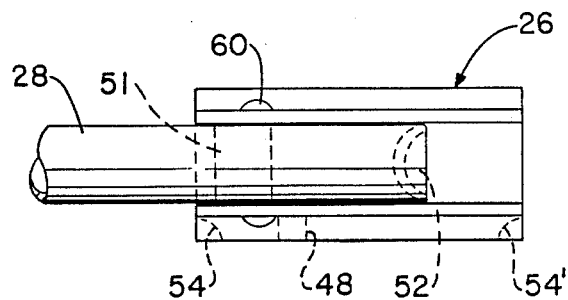
FIG. 5 is a side elevation of the rim handle yoke assembly of FIG. 3.

Referring now to the drawings, FIG. 1 shows the improved collapsible fish landing net of the invention comprising mesh netting 20, a rim assembly referred to generally by the numberal 22, a handle 24 and a yoke assembly 26. When assembled in its operable configuration as shown in the figure, the rim assembly of the landing net has a generally triangular shape from which the netting 20 hangs. The triangular area may be made larger or smaller within the limits of its telescoping components, but usually it will be assembled in its maximum configuration.

The rim assembly 22 comprises two rigid housing cylinders 28, two flexible telescoping arctuate members 30, two connecting sleeves 32, two compression springs 34 and two compression spring caps 36 joined at pivot point 38 by a pivot pin 40. The flexible arctuate members 30 are housed in the rigid housing cylinders 28 during storage, telescoping almost to the point where the connecting sleeves 32 meet the rigid housing cylinders 28 when collapsed. During assembly, the arctuate members 30 must be sufficiently flexible to permit the angle at pivot point 38 formed by the two connecting sleeves 32 to reach approximately 180 degrees. Once the assembly operation is complete, the arctuate members 30 must also retain their strength even though bent, during landing operations. Because of the need for both flexibility and strength, the arctuate members 30 typically are fabricated from a highly resilient plastic or elastomer, such as nylon or a semi-hard rubber. The rigid housing cylinders 28, on the other hand, may be composed of a lightweight but sturdy material which may be a material such as aluminum, or a hard thermosetting plastic. The connecting sleeves 32, need not be as flexible as the arctuate members 30, but it is normally preferable to have them made from a plastic such as nylon.

The rim assembly 22 is connected to handle 24 by means of yoke assembly 26, and the netting 20, is suspended from the rim assembly by winding the netting's outermost mesh portions helically around the rim assembly. In attaching the mesh netting 20 it has been found to be of great advantage to secure the netting to the yoke assembly 26 by means of attachment hooks 42, and also to threadably connect a portion of it through the compression springs 34. Fastening the netting in such fashion at both the top and the bottom of the rim assembly 22 eliminates undesirable netting voids at those locations. In addition, however, and perhaps even more importantly, it prevents the netting 20 from sliding either toward the bottom, handle portion of the net, or toward the top or head portion as the fish landing net is being assembled to its operable configuration, a tendency which interferes with easy deployment of the netting.

Assembly of the fish landing net is begun by extending the arctuate members 30 from their retracted position in rigid housing cylinders 28. After extension, the flexible arctuate members 30 are bent to achieve a 180 degree angle between the connecting sleeve 32. While the bending process is in progress, the compression spring caps 36 are pushed back against compression springs 34 to permit the connecting sleeves 32 to pivot at point 38 around pivot pin 40. Once the 180 degree position has been achieved, the caps 36 are released and are forced by compression springs 34 to a position in which they extend partially over both connecting sleeves 32, locking the sleeves firmly in alignment at the pivot point 38, and thus effectively locking the rim assembly in its position of use.

FIG. 2 shows the fish landing net in its disassembled state or storage configuration. In the figure, the caps 36 have been pushed back against compression springs 34, allowing connecting sleeves 32 to reassume their non-aligned position of repose about pivot point 38. Following this, arctuate members 32 are forcibly pushed down into the rigid housing cylinders 28. Simultaneously with compression of the arctuate members 30, the rigid housing cylinders 28 are pivoted about pivot points 44 until they are substantially parallel to each other and to handle 24. Release button 46 is then depressed so that it no longer protrudes from release button opening 48, allowing the handle 24 to be pushed upward through the yoke assembly 26 until the blister protrusion on the handle, indicated, generally by the numeral 50, becomes frictionally wedged against the top of the aperature sleeve in the yoke assembly through which the handle slides, preventing further movement and effectively locking the handle in its collapsed position. The blister protrusion locking method has the advantage of being both durable as well as inexpensive to produce, and is a very desirable modification to the design.

FIG. 3 shows details of the yoke assembly 26, particularly netting attachment hooks 42, release button opening 48, and pivot points 44 about which the rigid housing cylinders 28 rotate. It has been found to be decided improvement to provide the yoke assembly 26 with pivot limit partitions 51 which constrain the degree to which the rigid housing cylinders 28 can rotate towards each other during the disassembly process this stops the cylinders from rotating inwardly to the point at which they would prevent the pushing of handle 24 of FIG. 2 upward to its storage position. Partitions 51 have the additional advantage of strengthening the yoke assembly 26 at a point which experiences considerable stress during use of the landing net.

FIG. 3 also shows the crimped configuration 52 of the ends of rigid housing cylinders 28. Crimping or collapsing the ends has been discovered to provide a number of advantages in that it not only furnishes the ends of rigid housing cylinders 28 with the necessary cylinder wall surface angle, usually substantially parallel to sleeve 58 described in connection with FIG. 4, to avoid interference with handle 24 when the cylinders 28 are swung outwardly to their deployed position, but the double wall which results from the crimping reinforces the end portion of the cylinders, which is subjected to a deforming force during the deployment process.

Another feature illustrated by FIG. 3 are the ramp like, inclined recesses 54 and 54' which have been found to be of considerable benefit in operating the landing net inasmuch as the upper inclined recess 54 facilitates depression of release button 46 of FIG. 2, which is necessary in order to allow the button to slide beneath the outer surface of the yoke assembly 26 until it reaches release button opening 48 where it re-emerges, locking handle 24 in its operable position. Furthermore, in the process of collapsing handle 24, the lower inclined recess 54' helps guide the blister protrusion 50 into frictionally wedged engagement which the sleeve aperture through which the handle slides, locking the handle in its stored position.

While the yoke may be made from a variety of materials including metal or plastic, a high strength plastic which can be molded into the necessary shape is preferred, for example, nylon, polypropylene and similar materials.

FIG. 4 shows an end view of the yoke assembly of FIG. 3, further amplifying its details. The crimped ends 52 of the rigid housing cylinders 28, including pivot pins 60, can more easily be seen, as can the details of the inclined recesses exemplified by 54'. While the pivot pins 60 may be cotter pins, it has been found that much greater durability is experienced when such pins take the form of rivets. Also shown with increased clarity in the figure are net attachment hooks 42.

Also to be observed is the improvement provided by flattened surface 56, which is adapted to receive a correspondingly flattened handle 24, as shown in FIG. 9A. During use, the landing net of the invention is subjected to considerable force at its lateral extremities. These lateral forces in turn produce a significant torquing force on the juncture of the yoke assembly 26 with the handle 24 which fits into it. The torquing forces are of course resisted by the protrusion of the release button 46 of FIG. 2 from the handle through the release button opening 48. However, it has been found that under most circumstances, it is desirable to make additional provision for resisting the torquing force so that handle 24 is unable to rotate within sleeve 58 of yoke assembly 26. This need led to the discovery that effective torque resistance can be obtained by providing sleeve 58 with flattened surface 56 and by providing handle 24 with a mating flattened surface, thus making it impossible for the yoke assembly 26 to move independently of handle 24. The flattened surfaces are formed on a chord of the generally circular cross-section of the sleeve 58 or the surface 56 of handle 24, and extend over a substantial arc of the circular cross-section to affect the desired torque resistance.

FIG. 5 furnishes a side view of the yoke assembly 26 of FIG. 3, showing the crimped end of rigid housing cylinder 28, the inclined recesses 54 and 54', and pivot pins 60.

Figure 6:
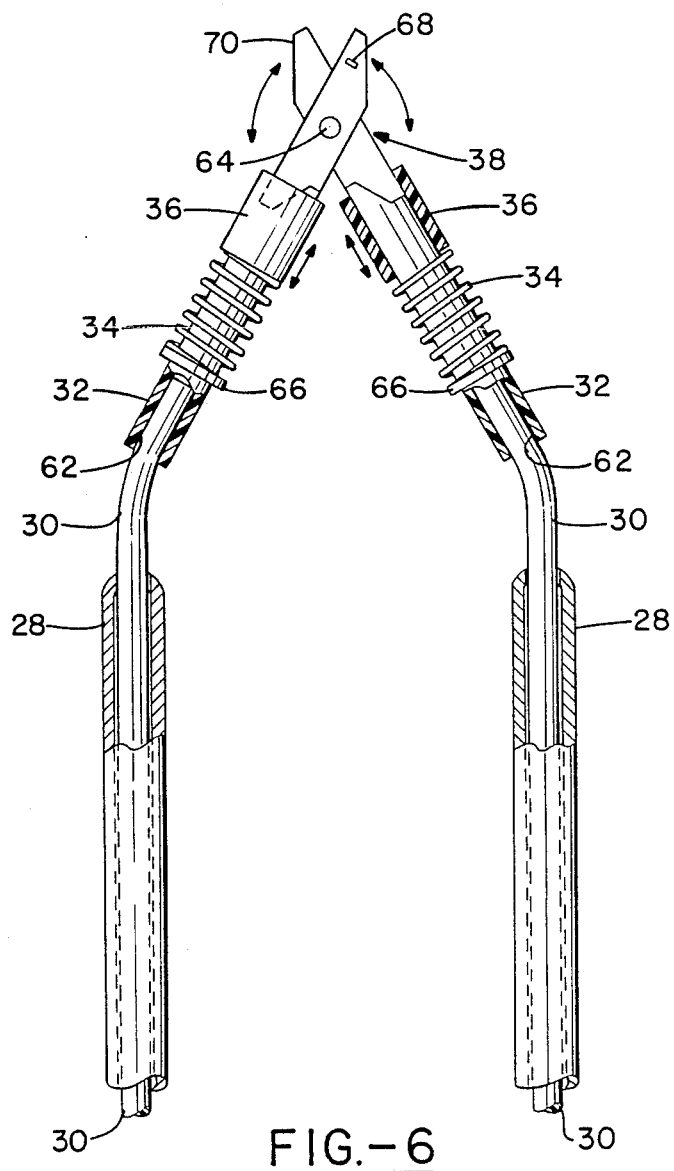
FIG. 6 is a top plan view of the collapsed and telescoped rim assembly in partial cross section.

FIG. 6, shows the upper portion of the rim assembly 22 in its collapsed, storage position. The rim assembly 22 as shown in the figure comprises rigid housing cylinders 28, the flexible arctuate members 30, and connecting sleeves 32. The junction 62 between the arctuate members 30 and connecting sleeves 32 m st be bonded so that the members are permanently joined. Depending on the material, this may be accomplished by adhesives thermal fusion, a tight friction fit, or otherwise. Compression springs 34 and caps 36 are also shown, as is pivot point 38. While the pivot point commonly has been secured with a rivet, it has been found to be highly desirable to employ a removable pin 64 such-as a bolt, screw, or cotter pin so that the sleeves 32 can be disconnected and worn or damaged netting replaced.

As indicated in the figure, each of the connecting sleeves 32 includes a flange 66 which serves as a stop for compression spring 34, and a protrusion 68 which functions as a stop for caps 36 when the rim assembly has been assembled. In the assembly process, as the compression spring caps 36 are pushed back against the compression springs 34, flanges 66 hold the springs in place. Similarly, when the connecting sleeves 32 have been aligned and caps 36 released, they are limited in their travel by protrusions 68 so that the caps are stably positioned over both connecting sleeves simultaneously, holding the sleeves in alignment. The taper 70 is usually provided to assist in sliding the caps 36 over the sleeves 32 in the assembly process.

FIG. 7 is another view of the upper part of rim assembly 22 after it has been put together. In the figure, the limiting influence of protrusions 68 on caps 36 can be seen. The compression springs 34, mounted on connecting sleeves 32, urging the caps 36 over both sleeves simultaneously as at the general area 70, are also shown.

FIG. 8 illustrates the improved manner in which arctuate members 30 are prevented from pulling out of rigid housing cylinders 28. While it has previously been the practice to restrain the arctuate members 30 by flaring their ends so as to prevent their withdrawal from the constricted ends of the rigid housing cylinders, it has been found that unless care is taken, the obstructing flares can be distortably compressed, and thus be ineffective if the arctuate members are withdrawn to vigorously. It has been discovered, however, that provision of locking rings 72 overcomes this disadvantage by holding the ends of the arctuate members 30 firmly in the rigid housing cylinders 28, irrespective of the forces to which they are subjected. The locking rings 72 can be made of metal or plastic, and they are firmly secured to the arctuate member by any joining technique that provides a strong bond. The width of such rings is relatively unimportant, commonly however a width of from ½ to 1" is employed.

FIG. 9 shows handle 24 with a useful innovation consisting of a telescoping extension handle 24' which nests inside handle 24, and which may be extended to provide greater overall landing net length, or telescoped inside handle 24 when greater length is not needed. Extensible handle 24' is secured in its extended position by means of release button 46' which extends through release button opening 48'. In its stored position release button 46' is depressed, and the extensible handle is pushed up inside handle 24 until release button 46" reaches release button opening 48', and extends therethrough, holding the extensible handle 24' firmly in its stored position. The figure also shows handle 24 in its extended operable position relative to yoke assembly 26, with release button 46 extending through release button opening 48, thereby holding the handle firmly in its position of use.

FIG. 9A is a cross section of handles 24 and 24' showing the torque defeating flattened portion of the handles' periphery.

FIG. 10 is a cut-away view of handle 24 provided for the purpose of showing details of the release button locking mechanism. In the figure, release button 46', which extends through release button opening 48', is continuously held under expansive pressure by flat spring 72 to which the release button 46' is attached, or forms an integral part of. The mechanism shown is identical with the other release buttons employed in the landing net of the invention.

While in accordance with the patent statutes, the best known embodiment of this invention has been described in detail, it is to be understood that the invention is not limited thereto or thereby, but that the scope of the invention is defined in the appended claims.

What is claimed is:

1. In a collapsible fish landing net including a collapsible rim assembly mesh netting, a yoke assembly and a substantially circular primary handle;

said rim assembly having two hollow rigid housing cylinder and two flexible arcuate members telescopable thereinto, but not detachable therefrom, each said arcuate member being attached to a lockable pivot point for securing said rim assembly in an operating configuration;

said pivot point being lockable by spring caps urged into locking position by compression springs, thereby causing said caps to extend over parts of both arcuate members simultaneously so as to hold said members in aligned position when the landing net is in its operating configurations;

said netting being strung on said rim assembly;

said primary handle having a spring operated release button for optionally maintaining said landing net in its operating configuration, or for collapsing it to its storage configuration;

said yoke assembly having a hollow central circular sleeve through which said primary handle slides when the landing net is being collapsed or opened, and said yoke assembly also being pivotally attached to said hollow rigid cylinders and having an opening through which said release button can extend, the improvement comprising providing said sleeve with a flat peripheral wall parallel to its longitudinal axis, thereby forming a first portion, and providing said primary handle with a flat peripheral wall parallel to its longitudinal axis, and extending the length of said primary handle thereby forming a second portion, said first and second portions being positioned adjacent to each other in mating relationship wherein each of said flat peripheral walls is formed on a chord of the generally circular cross-section of said sleeve or said primary handle extending over a substantial arc of said circular cross-section so as to prevent the transverse rotation of said sleeve relative to said handle, due to forces acting on said landing net at its lateral edges.

2. A collapsible fishing net according to claim 1 in which said primary handle includes a telescoping extension handle of smaller diameter than the primary handle, said extension handle being provided with a flat peripheral wall parallel to its longitudinal axis and extending the length of said extension handle, thereby forming a third portion, said second and third portions being positioned adjacent to each other in mating relationship, and said extension handle being fastened to said primary handle by means of a spring operated release button which when extended through an opening provided at the lower end of the primary handle holds the extension handle securely in its extended position, and which when depressed allows the extension handle to be telescoped into a stored position within said primary handle said release button being at a 180° relationship to the interrelated flat walls.

3. A collapsible fishing net according to claim 2 in which said yoke assembly is fabricated with vertical pivot limit partitions with constrain the degree to which said rigid housing cylinders can rotate towards each other in the landing net collapsing process.

4. A collapsible fishing net according to claim 1 in which the mesh netting strung on said rim assembly is engaged with attachment hooks provided on said yoke assembly and also engaged with through said compression springs, thereby preventing said netting from sliding along said rim assembly and bunching up toward the top or bottom of the assembly so as to interfere with deployment of the netting.

5. A collapsible fishing net according to claim 4 in which the pivot pin at the pivot point located at the juncture of the rigid housing cylinders is temporarily removable, thereby permitting replacement of the netting as required.

6. A collapsible fishing net according to claim 1 in which detachment of said arctuate members from said rigid housing cylinders is prevented by locking sleeve rings placed over, and secured to said arctuate members, thereby preventing their withdrawal from constricted ends of said cylinders.

7. A collapsible fishing net according to claim 3 in which the ends of said rigid housing cylinders are crimped at an angle such that when said cylinders are pivoted to the net's operating configuration, the crimped wall surface of the cylinders is substantially parallel to the sleeve of said yoke assembly.

8. A collapsible fishing net according to claim 3 in which the yoke assembly is provided with inclined recesses at both its upper and lower ends.

9. A collapsible fishing net according to claim 1 in which said primary handle is equipped with a blister protrusion integral with said handle at the lower end thereof.

* * * * *